US008663767B2

(12) United States Patent
Sjöberg et al.

(10) Patent No.: US 8,663,767 B2
(45) Date of Patent: Mar. 4, 2014

(54) HOLLOW PROFILE USED IN THE MANUFACTURE OF A PIPE

(75) Inventors: Sven Sjöberg, Vaasa (FI); Christian Vestman, Vaasa (FI)

(73) Assignee: Oy KWH Pipe AB, Vaasa (FI)

( * ) Notice: Subject to any disclaimer, the term of this patent is extended or adjusted under 35 U.S.C. 154(b) by 0 days.

(21) Appl. No.: 13/520,763

(22) PCT Filed: Jan. 18, 2011

(86) PCT No.: PCT/FI2011/050033
§ 371 (c)(1),
(2), (4) Date: Sep. 21, 2012

(87) PCT Pub. No.: WO2011/089314
PCT Pub. Date: Jul. 28, 2011

(65) Prior Publication Data
US 2013/0011620 A1    Jan. 10, 2013

(30) Foreign Application Priority Data

Jan. 22, 2010   (FI) ..................................... 20105059

(51) Int. Cl.
*B29D 22/00*   (2006.01)
*B29D 23/00*   (2006.01)
*B32B 1/08*    (2006.01)

(52) U.S. Cl.
USPC ...... 428/36.92; 428/158; 428/36.9; 428/35.7; 428/36.4

(58) Field of Classification Search
USPC ................... 428/158, 36.9, 36.92, 35.7, 36.4
See application file for complete search history.

(56) References Cited

U.S. PATENT DOCUMENTS 3,926,223 A    12/1975   Petzetakis

FOREIGN PATENT DOCUMENTS

| JP | 8-103968 A | 4/1996 |
| JP | 8-192472 A | 7/1996 |
| KR | 10-2006-0020373 A | 3/2006 |
| NL | 7308660 A | 12/1973 |
| WO | WO 2004/076903 A1 | 9/2004 |

*Primary Examiner* — Michael C Miggins
(74) *Attorney, Agent, or Firm* — Birch, Stewart, Kolasch & Birch, LLP

(57) ABSTRACT

A hollow profile used in the manufacture of a spirally wound double-walled thermo-plastic pipe, having essentially a rectangular cross section, two side walls and an outer wall and an inner wall limiting a cavity within. In the hollow profile the inner wall of the pipe is thicker than the wall of the hollow profile intended to form the outer wall of the pipe. The inner rounding radius of the edges adjacent to the thicker wall of the hollow profile is considerably larger than the rounding radius of the two other edges of the cavity and the inside surface of the thicker wall comprises a rib extending in the hollow cavity of the profile, on the side of the profile forming the inner side of the pipe, in the longitudinal direction of the profile at least essentially along the whole length of the profile.

8 Claims, 3 Drawing Sheets

HOLLOW PROFILE USED IN THE MANUFACTURE OF A PIPE

The invention relates to thermoplastic profiles and to methods of their production. In particular, the present invention concerns a hollow thermoplastic profile having an essentially rectangular cross-section, which profile is used in the manufacture of spirally wound double-walled thermoplastic pipes. A method of producing such a profile as well as spirally wound double-walled thermoplastic pipes consisting of the hollow profiles is also described.

In the manufacture of a double-walled thermoplastic pipe of the type commercially known as Weholite, a hollow profile is spirally wound around a drum, or the like, corresponding to the inner diameter of a pipe, and adjacent loops of the hollow profile are welded together to form the cylindrical wall of the pipe.

A pipe manufactured in the described manner is lightweight and exhibits good ring stiffness compared to solid pipes manufactured using the same amount of material, and the double-walled structure will give the pipe good insulating properties.

The hollow profile used in the manufacture of a conventional spirally wound pipe has an essentially rectangular cross section. Typically all edges of the rectangle are rounded with a rounding radius of the same size, and each wall of the hollow profile has approximately the same thickness. In order to produce a pipe wall that has an even thickness after welding, the walls of the profile that are joined together, must be straight and have same height, which leads inevitably to a rectangular cross section. The hole in the profile should follow the contour of the outer cross section in order to minimize use of material.

The above wall structure of these pipes, which are primarily intended for pressureless transport of fluids, is optimized to resist outer loads, such as earth load, ground water and traffic load, but they are not intended to be used in applications wherein the internal pressure in the pipe is increased. An increased inner pressure may damage the wall of the pipe.

International Patent Application No. WO 2004/076903 discloses an embodiment of the above basic structure especially developed for conducting fluids under low or moderate pressures. The suggested solution comprises a hollow profile structure in which the inner rounding radius of the edges adjacent to the thicker wall of the hollow profile is considerably larger than the rounding radius of the two other edges of the cavity. Furthermore, the thickness of the wall of the hollow profile is smallest in the middle section of this wall and it progressively grows towards the two hollow profile side edges adjacent to this wall.

The known profile provides an improvement to the strength of the pipe to withstand internal pressure, but the stress peaks are set on points that are not optimal in view of manufacturing and long term use of the pipe. The stress peaks are namely set at the middle of the inner wall and at the welded seams between the loops of the profile. As such this is not a problem, but a welding seam always creates a discontinuity in the material, whereby a notch factor thus caused may cause danger of damage and failure of the structure especially under terminally changing loads. Typically changing load relates to different kind of vibrations. For pipes a changing load may be caused by changes of pressure either over relatively long time or rapid changes caused by pumping, for example. The welded seams may also include small cracks or impurities that can provide starting point, a nucleus, for advancing crack in the material. For the above reasons a main principle in structural design is to create such forms and dimensions for the structure that it is designed so that the stress points or peaks are away from any discontinuities of the structure. This may prove difficult since one has to simultaneously take account use of material, the entire usability of the structure and weight of the final product, for example. However, when elastic materials are used for making pipes, the elasticity of the material absorbs some of the stresses around crack nucleuses, whereby they are less prone to form propagating cracks that might lead to structural failure. In any case, regardless of what material is used, it is better to design the structure so that the highest stresses are placed on areas where the material is as coherent and uniform as possible.

It is an aim of the present invention to provide an alternative profile structure which can be used for constructing spirally wound pipe walls suitable for conducting non-pressurized fluids and pressurized fluids at pressures of up to about 2 or even to 3 bar.

The invention is based on the idea of providing a hollow profile having a generally rectangular cross-section, in which in the hollow cavity of the profile, on the side of the profile forming the inner side of the pipe, exhibits a protrusion in the longitudinal direction of the profile at least essentially extending along the whole length of the profile. Thus, in cross-section, the profile has a rib on the lower, inner side of the rectangular cross-section, a rib which extends generally towards the middle of the rectangle. The rib has a lateral extension of less than 50% of the total breadth of the profile.

A profile of the indicated kind can be produced by extruding a profile through an extruder die head having a die and mandrel, said die and mandrel having an annular cross-section wherein the inner form of the die defines the outer cross section of the profile and the outer cross section of the mandrel defines the inner cross section of the profile, i.e. the form of the cross section of the cavity. The mandrel comprises a groove having dimensions that correspond the dimensions of the protrusion in the cavity of the profile.

For the reasons mentioned above, the outer cross section of the profile is rectangular as well as the inner cross section.

The three walls of the hollow profile not comprising a rib may have preferably a thickness equal to each other.

The ratio of the minimum thickness of the thicker wall to the thickness of the other walls of a hollow profile intended for the manufacture of a pipe having an inner diameter of 1200 mm is preferably 120:77 and the inner rounding radius of the edges adjacent to the thicker wall is preferably 24 mm.

Considerable advantages are achieved by the present invention. The rib in the cavity of the profile distributes the stresses completely in a different way compared to any earlier profiles. Now, the simulations made on a tube structure show that the maximum stress peaks are placed next to the roots of the rib and the stress level at the welded seam is reduced. This increases the strength of the structure under static load and both reliability and strength under variable load. The maximum stress is now placed on a section of the material that has been produced by continuous extrusion. In continuous extrusion the manufacturing parameters and conditions can be kept constant and as close as possible at optimum, whereby the produced material has homogeneous structure and material defects that might act as nucleus for cracks can be kept in minimum. Also, the area of highest stress is at placed at the cavity of the profile. This provides extra safety since in a rare case that the inner wall ruptures, the outer wall is intact and may withstand long enough that spilling of material that is transported in the pipe is avoided.

The inner surface of the pipe can be welded smooth, whereby better pressure resistance can be achieved as notch factor of the welded seam is decreased. In this case also manufacturing of joints and fittings is easy as they can be more easily adapted on a smooth surface.

The invention is preferably used in conjunction of rounded inner edges described in WO 2004/076903.

In the following the invention is described with reference to the enclosed figures wherein FIG. 1 shows a diagram of a section of a pipe in cross section and according to one embodiment of the invention, including stress levels under load.

As a material for the hollow profile, an extrudable thermoplastic, such as polyolefin, preferably HD-polyethylene or polypropylene, can be used. By modifying the thermoplastic with fillers and/or reinforcing agents, improved pressure resistant properties in combination with improved ring stiffness properties are achieved. Some standards require use of pressure rated PE grades in a pressurized system. At the moment PE80 or PE100 materials are allowed for Europe and Asia and e.g. PE 3408 is allowed for North America.

A pipe described herein as an example is a typical example that is suitable for requirements of large number of customers. The dimensioning goals were: size up to ID 1200 mm, max pressure 2 bar, and maximum stress level in the pipe wall structure 5 MPa.

Figure 1:
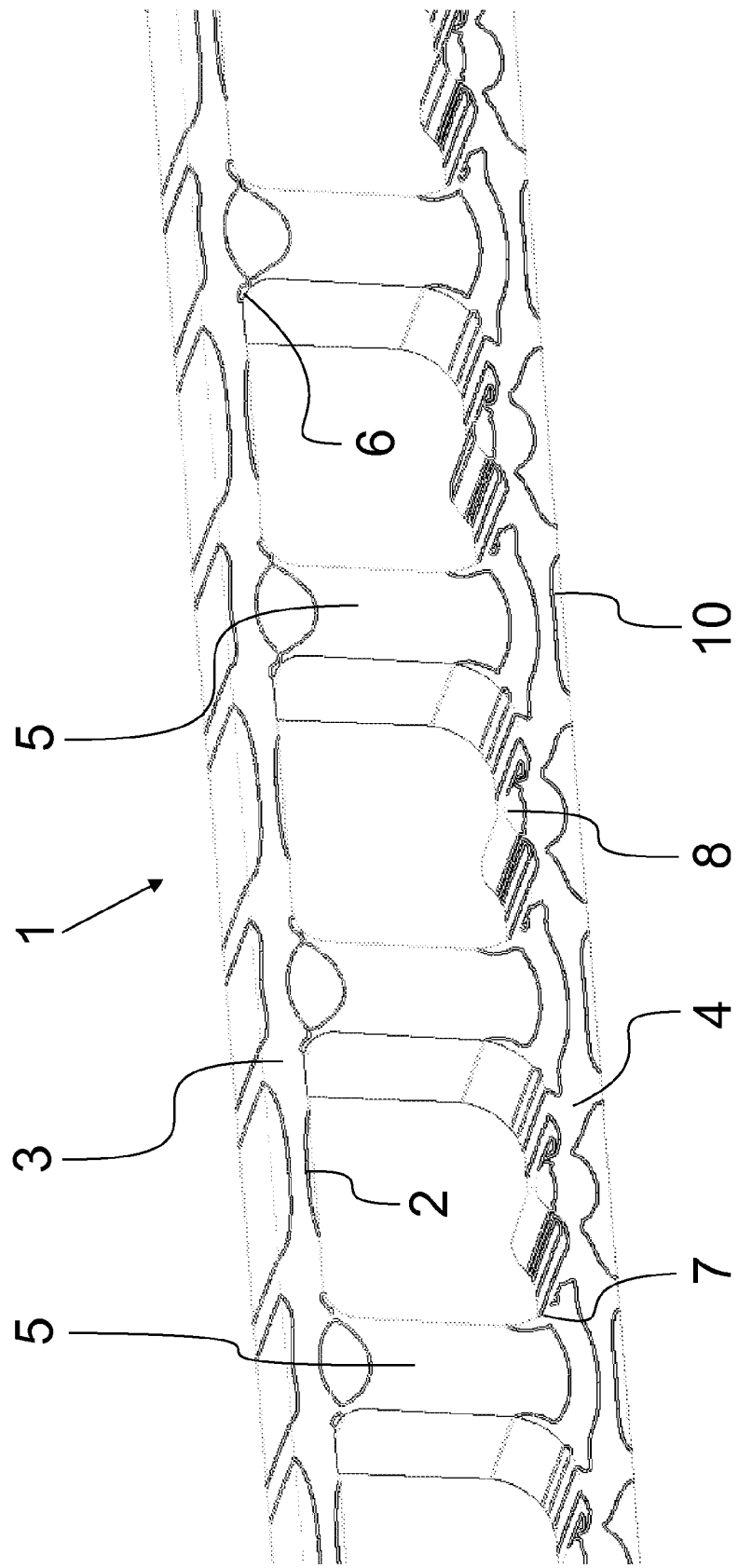

FIG. 1 shows a cross section of a section of a pipe made of profiles according to one embodiment of the invention. The seam between the adjacent profiles 1 is not clearly visible, but it is located in the middle of the wall between two cavities 2 of the profile 1. The cross section of the profile is rectangular, having two longer walls, an outer wall 3 and an inner wall 4 and two sidewalls 5 that are joined together to form a pipe. As can be seen from the figure, all walls 3 and 5 of the profile have approximately the same thickness, and all edges of its hollow cavity 2 have been rounded. For example for the manufacture of a spirally wound sloping pipe of an inner diameter of 1200 mm, a hollow profile 1 of this type can be used, the outer width of the cross section of which is 93.8 mm and the outer height is 75 mm.

A hollow profile 1 according to the invention enables the manufacture of a spirally wound pipe, which considerably better resist an internal pressure. The wall 4 of the hollow profile according to the invention, which is intended to form the inner wall of a spirally wound pipe, has an essentially larger thickness compared to the other walls 3 and 5 of the hollow profile, while a rounding radius 7 of the edges of the hollow space 4 adjacent to the inside wall 4 is considerably larger than the rounding radius of the two other edges 6. According to one advantageous embodiment, the thickness of the wall 4 is not constant over its whole width. The inner wall has a rib 8 in the middle of the wall 4. The rib 8 extends towards the interior of the cavity 2 and it is dimensioned so that its width is less than half of the distance between the inside of the sidewalls 5 of the profile and less than smallest thickness of the inner wall 4. In other words, the distance between the surface of the wall that is placed pointing towards the inside of a tube is less than twice the smallest diameter of the inner wall 4. The rib 8 contoured to have a smooth rounded cross section that joins the inner wall 4 as a smooth slope to minimize the notch factor. The thickness is smallest in the middle of ridge and sidewalls 5 and it is progressively growing towards the two edges of the hollow profile adjacent to sidewalls 5 so that the cavity of the hollow profile 1 has approximately an wave-shaped cross section at this thickened wall 2. For the manufacture of a spirally wound pipe of an inner diameter of 1200 mm, the minimum thickness of the thickened wall 4 can be 12 mm, while the other walls 3 and 5 of the hollow profile 1 have a thickness of 7.7 mm. The rounding radius 7 at the edges of the hollow space 2 adjacent to the inner wall 4 is at its smallest 24 mm.

Figure 2:
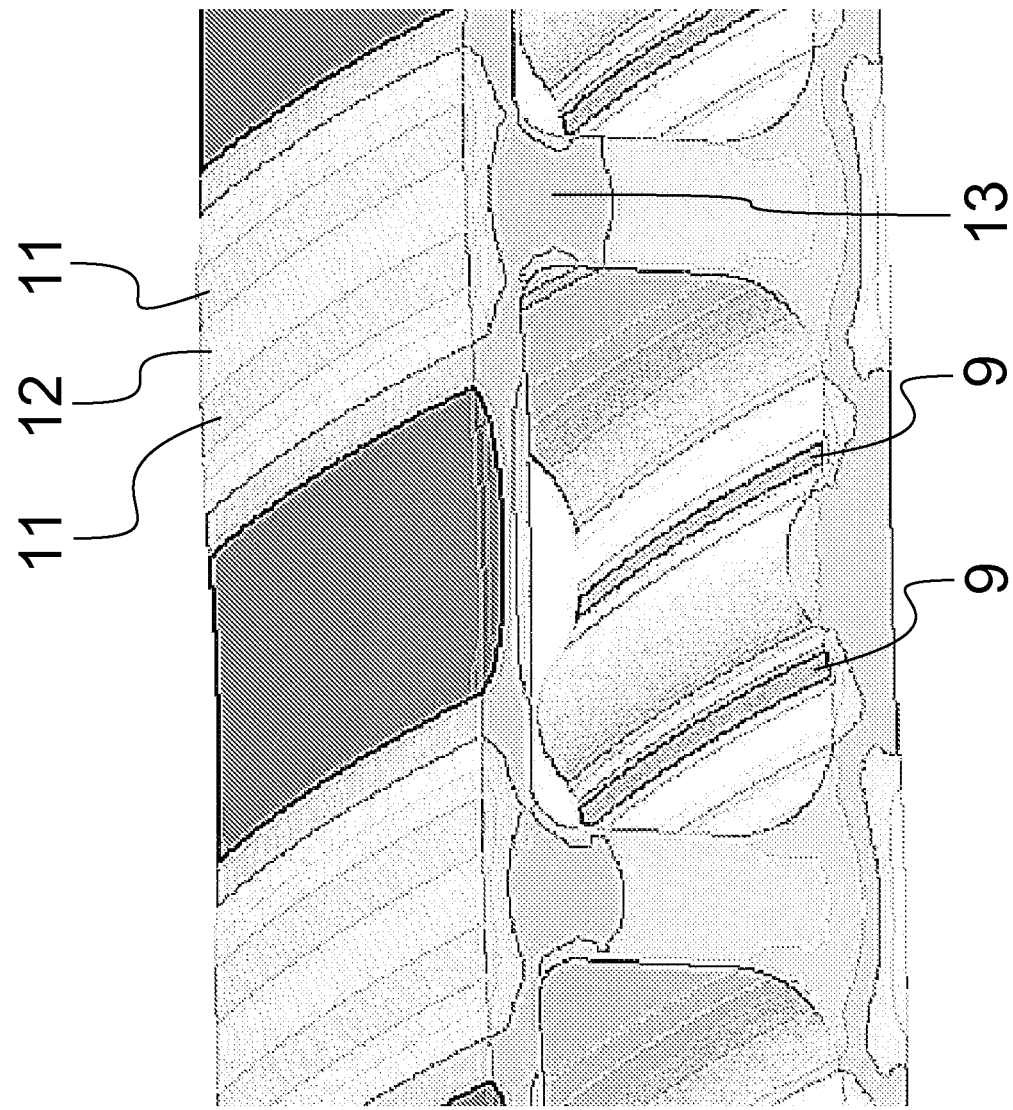
FIG. 2 is another view of a cross section of a section of a pipe shown in FIG. 1.

For the comparison of the hollow profiles of WO 2004/076903, a pipe section according to the invention has been analyzed using FEM-calculation and pressure tests. Lines in FIGS. 1 and 2 depict stress levels thus obtained. The highest stresses under internal pressure exist beside the rib 8 on the inner wall 4. This area is marked with reference number 9 (FIG. 2). Stress on the welded seam area, marked 10, is reduced to 5 MPa, which was the original goal of the invention. The highest stress level has also been transferred from the seam area. When the outer surface of the pipe section is studied, that stress level at seam area (marked 11, 12) is lower and stress 13 inside the welded dividing wall 5, 5 is spread on a larger area and point-like stress is reduced. As will appear from the results, a considerable improvement with respect to the pressure resistance property of a pipe is achieved by means of the hollow profile according to the invention.

Figure 4:
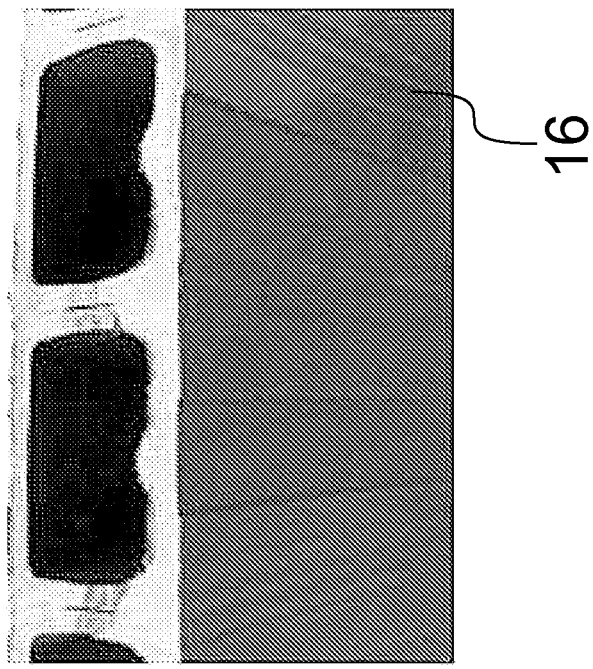
FIG. 4 shows one embodiment of a pipe section wherein another welding method is used.
Figure 3:
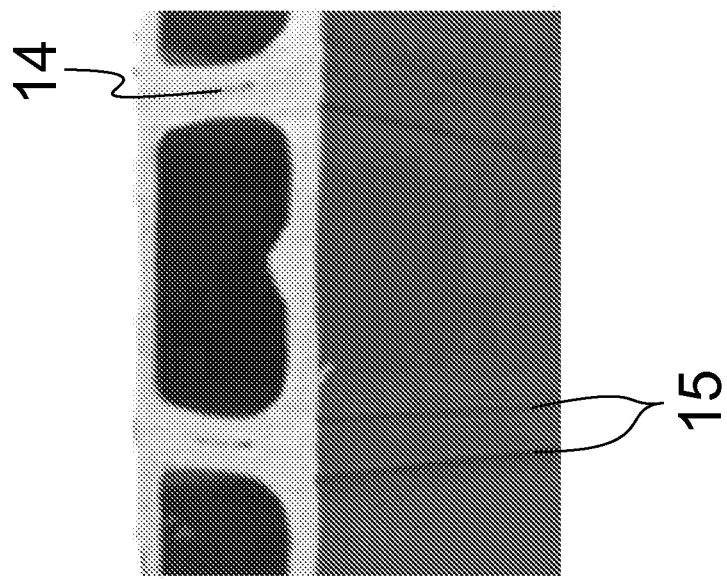
FIG. 3 shows one embodiment of a pipe section wherein first welding method is used.

FIGS. 3 and 4 show two different kinds of pipe sections made of a profile according to the invention. It must be noted, that a pipe is normally made as a whole pipe, not of sections and these sections are shown here only for illustrative purposes. In FIG. 3 the seam 14 is welded in normal style used for making these kind of pipes. In this solution two parallel grooves 15 are formed on each side of the seam 14. As such the grooves are the weakest point in the wall since they form a stress peak in a pressurized wall. However, if the pipe is dimensioned properly, grooves are not a risk. A more preferable embodiment is described in FIG. 4.

One feature that is also shown in FIG. 3 is that the profiles are welded together only partially at inner and outer surfaces of the pipe to be manufactured. Welding the seam over whole depth is unnecessary since the stresses are placed on or near the surfaces of the structure. The welded seam 14 in FIG. 4 is flat over the welded area 16 providing a smooth, even surface. This is possible because of different stress distribution because of the rib. When welds are made smooth, it can be secured that the stress peaks are at the inner wall of the profile beside the rib 8 and not at the outer wall of the profile where is the highest pressure. A smooth surface makes is easier to implement fixtures and connections on the pipe

The invention claimed is:

1. A hollow profile used in manufacture of a spirally wound double-walled thermo-plastic pipe, the hollow profile comprising:

a substantially rectangular-shaped cross section having two side walls, an outer wall, and an inner wall which form a hollow cavity within, wherein the inner wall is intended to form the inner wall of the pipe, and the outer wall is intended to form the outer wall of the pipe, and the inner wall is thicker than the outer wall, wherein the hollow cavity includes two edges where the inner wall joins the two side walls and two other edges where the outer wall joins the two side walls, the edges where the inner wall join the side walls having inner rounding radii that are larger than the rounding radii of the two other edges where the outer wall joins the two side walls, the hollow profile further comprising:

a rib extending into the hollow cavity is formed on an inside surface of the inner wall of the profile wherein the rib is arranged on the inside surface of the inner wall in a position midway between the two side walls and extends in a longitudinal direction of the profile along substantially an entire length of the profile, and wherein the inner wall has a thickness that is largest at the rib, has a point of smallest thickness between each side of the rib and the edges where the inner wall joins the side walls, and has an area between the point of the smallest thickness and the edges where the inner wall joins the side walls in which the thickness progressively grows.

2. The hollow profile according claim 1, wherein the hollow profile is made of an extrudable polyolefin.

3. The hollow profile according to claim 1, wherein the hollow profile is made of an extrudable PE-HD.

4. The hollow profile according to claim 1, wherein the hollow profile is made of polypropylene.

5. The hollow profile according to claim 1, wherein the rib has a height of less than twice the smallest thickness of the inner wall.

6. The hollow profile according to claim 5, wherein a width of the rib is less than half of a distance between insides of the two side walls of the profile, and less than the smallest thickness of the inner wall.

7. The hollow profile according to claim 1, wherein the hollow profile is made of an extrudable thermoplastics. polypropylene.

8. The hollow profile according to claim 7, wherein the thermoplastics are modified with fillers and/or reinforcing agents for further improving pressure resistance and ring stiffness properties.

* * * * *